United States Patent [19]

Nakazato

[11] Patent Number: 5,335,078

[45] Date of Patent: Aug. 2, 1994

[54] IMAGE SIGNAL RECORDING APPARATUS OR REPRODUCING APPARATUS

[75] Inventor: Saburou Nakazato, Tokyo, Japan

[73] Assignee: Canon Kabushiki Kaisha, Tokyo, Japan

[21] Appl. No.: 118,572

[22] Filed: Sep. 8, 1993

Related U.S. Application Data

[63] Continuation of Ser. No. 873,614, Apr. 22, 1992, abandoned, which is a continuation of Ser. No. 762,781, Sep. 19, 1991, abandoned, which is a continuation of Ser. No. 243,991, Sep. 13, 1988, abandoned.

[51] Int. Cl.⁵ .............................................. H04N 9/80
[52] U.S. Cl. .................................... 358/330; 358/340; 358/342; 360/35.1
[58] Field of Search ................ 358/310, 330, 335, 340, 358/342; 360/30, 35.1

[56] References Cited

U.S. PATENT DOCUMENTS

| | | | |
|---|---|---|---|
| 3,084,224 | 4/1963 | Sanford | 360/30 |
| 3,350,504 | 10/1967 | Takayanagi | 360/30 |
| 3,402,256 | 9/1968 | Kinjo | 360/30 |
| 4,334,249 | 6/1982 | Yokoyama | 360/30 |
| 4,425,585 | 1/1984 | Sekimoto et al. | 358/330 X |
| 4,580,174 | 4/1986 | Tokunaka | 358/330 X |
| 4,591,930 | 5/1986 | Baumeister | 360/30 X |
| 4,725,894 | 2/1988 | Sasaki et al. | 358/330 X |
| 4,746,992 | 5/1988 | Hashimoto et al. | 358/330 X |
| 4,796,097 | 1/1989 | Mashimo | 358/330 |

Primary Examiner—W. R. Young
Attorney, Agent, or Firm—Robin, Blecker, Daley & Driscoll

[57] ABSTRACT

In a recording aspect, an image signal is angle-modulated into a first frequency band. A second or third angle-modulated signal is formed by frequency-converting the first angle-modulated signal respectively into a second or a third frequency band on the basis of first or second reference signals generated in the apparatus. The thus formed angle-modulated signal is recorded. In the course of reproduction, the recorded one of the second or third angle-modulated signals is reproduced, frequency-converted on the basis of the first or second reference signals into the first frequency band to provide the first angle-modulated signal, and is then demodulated to restore the image signal.

9 Claims, 3 Drawing Sheets

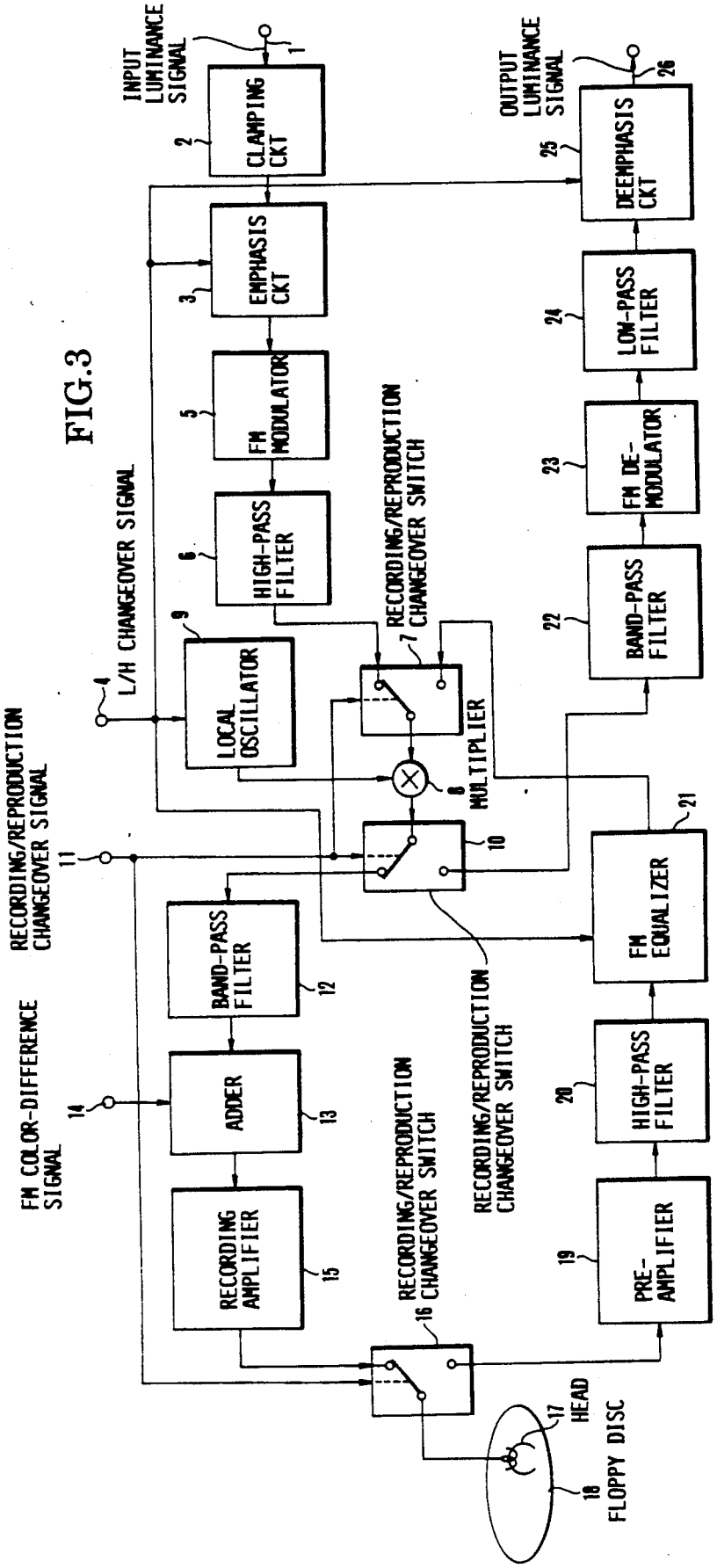

IMAGE SIGNAL RECORDING APPARATUS OR REPRODUCING APPARATUS

This is a continuation application under 37 CFR 1.62 of prior application Ser. No. 873,614, filed Apr. 22, 1992, now abandoned, which is a continuation application under 37 CFR 1.62 of prior application Ser. No. 762,781, filed Sep. 19, 1991, now abandoned, which is a continuation application under 37 CFR 1.62 of prior application Ser. No. 243,991, filed Sep. 13, 1988, now abandoned.

BACKGROUND OF THE INVENTION

1. Field of the Invention

This invention relates to an apparatus for recording image signals with angle modulation on a recording medium, or an apparatus for reproducing the angle-modulated image signals from the recording medium.

2. Description of the Related Art

As the recording or reproducing apparatus of this kind there has been known a still video floppy system formed in such a way that FM-modulated image signals are recorded on, and reproduced from a 2 in. floppy disc, (hereinafter called "still video system").

In this still video system, it is conventional that as the frequency allocation for the record signal to be recorded on the disc, what is shown in FIG. 1(a) is employed, (hereinafter being called "low-band FM frequency allocation"). That is, as shown in FIG. 1(a), the luminance signal and the color-difference signals each are FM modulated. Also, as to the color-difference signals, they are recorded as a color-difference line-sequential signal publicly known in which the R-Y signal and the B-Y signal are generated alternately by each horizontal period. At this time, the frequency of a sync. tip portion of the FM luminance signal is 6 MHz, and the frequency of a white peak portion is 7.5 MHz. As to the FM color-difference signals, the central carrier frequency of the R-Y signal is 1.2 MHz, and the central carrier frequency of the B-Y signal is 1.3 MHz.

In the conventional low-band FM frequency allocation described above, about 4.5 MHz as the luminance signal band of the reproduced signal, and about 350 TV lines as the horizontal resolving power are obtained.

In recent years, however, as the image quality and the frame size of the television monitor increase, it is being desired to widen the band of the luminance signal. To such a demand, the performances of the recording medium, the recording head, etc. are increased so that it is becoming possible to realize a recording or reproducing by a frequency allocation, for example, that shown in FIG. 1(b) (hereinafter called "high-band FM frequency allocation"). This high-band FM frequency allocation shown in FIG. 1(b) is that the frequency of the sync. tip portion of the FM luminance signal is 8 MHz, and the frequency of the white peak portion is 10 MHz. As to the FM color-difference signals, the conventional low-band FM frequency allocation shown in FIG. 1(a) applies without any alteration. According to this high-band FM frequency allocation, a luminance signal band of the reproduce signal of about 6.5 MHz, and a horizontal resolving power of about 520 TV lines are obtained.

In the case that such a higher band of the FM image signal as has been described above has been realized, on having taken compatibility with the prior known apparatus, it becomes necessary to increase the performance of the apparatus.

However, for a case that an apparatus capable of recording or reproducing either of the low-band FM image signal and the high-band FM image signal, the following two important problems arise.

The first problem is that it becomes necessary to secure linearity throughout a wide band of the FM modulator. The second problem is that when to demodulate the high band FM image signal, the moire increases because the bands of the baseband luminance signal and the doubled FM signal overlap each other.

On further explanation of the first problem or the linearity of the FM modulator, to secure a sufficient performance in both FM luminance signal bands shown in FIG. 1(a) and FIG. 1(b), it is required to improve the linearity of the FM modulator at least to the instantaneous frequency by the emphasis. In other words, the linearity over the wide band of about 4 MHz-13 MHz is required, and the deviation to the frequency is large, so that the sufficient performance is difficult to obtain.

Concerning the second problem or the increase of the moire at the time of FM demodulation, a further explanation is made by using FIG. 2(a) and FIG. 2(b). FIG. 2(a) shows the relationship of the baseband luminance signal and the doubled FM signal at the time of FM demodulation in the case of the low-band FM image signal. FIG. 2(b), on the other hand, shows the relationship of the baseband luminance signal and the doubled FM signal at the time of demodulation of the high-band FM image signal.

As shown in FIG. 2(a), in the case of the low-band FM image signal, in the baseband luminance signal there occurs no interference with the doubled FM signal due to the demodulating operation. To the contrary, as shown in FIG. 2(b), in the case of the high-band FM image signal, an interference of the doubled FM signal to the baseband luminance signal occurs (in the hatched portion in the figure), giving rise to a problem that the image quality is deteriorated by the increase of moire as the band is widened. Particularly when a still image is reproduced as in the still video system, the presence of moire on the picture appears very conspicuously. Hence it deteriorates the image quality very much.

SUMMARY OF THE INVENTION

An object of the invention is to provide an image signal recording apparatus and/or reproducing apparatus which can solve the above-described problems.

Another object of the invention is to provide an image signal recording apparatus capable of angle-modulating the image signal in a good state and recording it.

Under such an object, according to the present invention, as one embodiment thereof, there is provided an image signal recording apparatus for recording an angle-modulated image signals on a recording medium, which comprises: angle-modulating means for inputting an image signal and angle-modulating the input image signal into a first frequency band which is sufficiently higher than a second frequency band and a third frequency band which are different from each other, thereby forming and outputting a first angle-modulated image signal; reference signal generating means for selectively outputting a first reference signal and a second reference signal having respective different frequencies; frequency-converting means for frequency-converting the angle-demodulated image signal into the second frequency band or the third frequency band on the basis of the first reference signal or the second reference signal which is selectively outputted from the reference signal generating means, thereby outputting the frequency-converted signal; and recording means for recording the angle-modulated image signal output from the frequency-converting means on the recording medium.

Also, another object of the invention is to provide an image signal reproducing apparatus which is above to reproduce and restore an image signal recorded on a recording medium without receiving disturbances such as moire.

Under such an object, according to the invention, as on embodiment thereof, there is provided an image signal reproducing apparatus for reproducing and restoring an image signal from a recording medium on which one of a first angle-modulated image signal having a first frequency band and a second angle-modulated image signal having a second frequency band which is wider than the first frequency band is recorded, which comprises: reproducing means for reproducing one of the first angle-modulated image signal and the second angle-modulated image signal from the recording medium; reference signal generating means for selectively outputting a first reference signal and a second reference signal having respective difference frequencies in accordance with the sort of the angle-modulated image signal reproduced by the reproducing means; frequency-converting means for frequency-converting the first angle-modulated image signal or the second angle-modulated image signal reproduced by the reproducing means into a third frequency band which is located in a frequency band which is sufficiently higher than the first frequency band or the second frequency band, on the basis of the first reference signal or the second reference signal which is selectively outputted from the reference signal generating means, to form and output a third angle-modulated image signal; and angle-demodulating means for angle-demodulating the third angle-modulated image signal outputted from the frequency-converting means.

Further, an object of the invention is to provide as image signal recording and reproducing apparatus of simple structure, in which without making the apparatus complicated, the image signal, which its deterioration being suppressed, can be recorded on a recording medium and reproduced therefrom.

Under such an object, according to the invention, as one embodiment thereof, there is provided an image signal recording and reproducing apparatus for recording an image signal including at least a luminance signal on a recording medium, and for reproducing the image signal from the recording medium having the image signal recorded thereon, which comprises: angle-modulating means for forming and outputting a first angle-demodulated luminance signal by angle-modulating a luminance signal included in the image signal into a first frequency band which is located in a frequency band sufficiently higher than a second frequency and or a third frequency band different from each other; reference signal generating means for selectively outputting a first reference signal and a second reference signal having different frequencies from each other; frequency-converting means for frequency-converting the first angle-modulated luminance signal on the basis of the first reference signal or the second reference signal selectively outputted from the reference signal generating means, at the time of recording, thereby outputting a second angle-modulated luminance signal having the second frequency band or a third angle-modulated luminance signal having the third frequency band and for frequency-converting the signal reproduced from the recording medium into the first frequency band on the basis of the first reference signal or the second reference signal selectively outputted from the reference signal generating means, at the time of reproduction, thereby outputting the first angle-modulated luminance signal; recording and reproducing means for recording the second angle-modulated luminance signal or the third angle-modulated luminance signal outputted from the frequency-modulating means, at the time of recording, and for reproducing and outputting the second angle-modulated luminance signal or the third angle-modulated luminance signal, at the time of reproduction; and demodulating means for angle-demodulating the first angle-modulated luminance signal outputted from the frequency-converting means and restoring the luminance signal, at the time of reproduction.

Other objects than those described above of the invention and its features will become apparent from the following detailed description of embodiment of the invention with reference to the drawings.

BRIEF DESCRIPTION OF THE DRAWINGS

FIG. 3 is a block diagram of a still video apparatus to which the invention is applied as one embodiment of the invention.

DETAILED DESCRIPTION OF THE PREFERRED EMBODIMENT

Figure 1A:
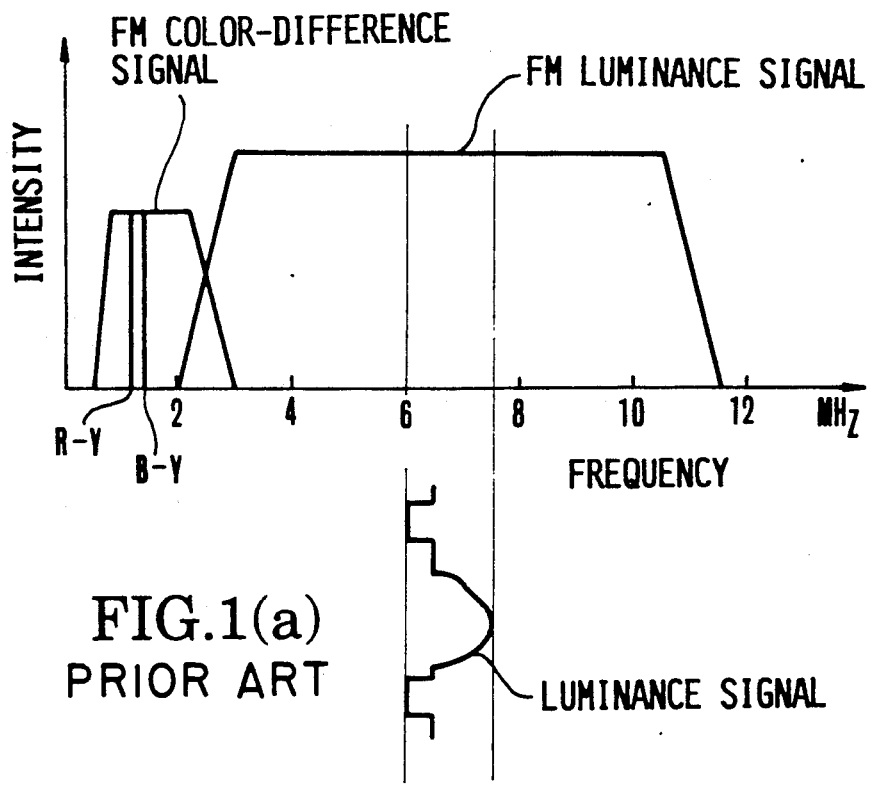
FIG. 1(a) is a graph to explain the low-band FM frequency allocation.

In the following, the present invention is described in detail on the basis of an embodiment.

FIG. 3 is the block diagram of the construction of the still video apparatus to which the invention is applied as one embodiment of the invention. Incidentally, this figure shows only that portion which concerns the recording and reproducing of the luminance signal or the essential parts of the embodiment, while the system controller, the color signal processing portion, the disc drive portion, etc. are omitted.

It should be noted that in this embodiment explanation is made with a recording mode in which a record signal based on the above-described low-band FM frequency allocation is formed and recording is carried out being called "low-band FM recording mode", and another recording mode in which a record signal based on the above-described high-band FM frequency allocation is formed and recording is carried out being called "high-band FM recording mode".

In FIG. 3, 1 is an input luminance signal; 2 is a clamping circuit; 3 is an emphasis circuit. The input luminance signal 1 is input through the clamping circuit 2 to the emphasis circuit 3.

An L/H changeover signal 4 to be described later is supplied from a system controller (not shown) to the emphasis circuit 3.

5 is an FM modulator; 6 is a high-pass filter; and 7 is a recording/reproduction changeover switch. The output signal of the emphasis circuit 3 is input to the FM modulator 5, and the output of the FM modulator 5 is input through the high-pass filter 6 to the recording/reproduction changeover switch 7.

8 is a multiplier; 9 is a local oscillator. The local oscillator 9 is supplied with the L/H changeover signal 4. The output signal of the recording/reproduction changeover switch 7 and the output signal of the local oscillator 9 are input to the multiplier 8.

10 is another recording/reproduction changeover switch, to which the output of the multiplier 8 is input. The recording/reproduction changeover switches 7 and 10 are supplied with a recording/reproduction changeover signal 11 as a control signal from the system controller (not shown).

12 is a band-pass filter; 13 is an adder. The output signal of the recording/reproduction changeover switch 10 is input through the band-pass filter 12 to the adder 13. Besides this, FM color-difference signals from the color signal processing portion (not shown) are input to the adder 13.

15 is a recording amplifier; 16 is another recording/reproduction changeover switch; 17 is a recording/reproduction head; 18 is a floppy disc. The output signal of the adder 13 is input to the recording amplifier 15. The output signal of the recording amplifier 15 is supplied through the recording/reproduction changeover switch 16 to the recording/reproduction head 17, and recorded on the floppy disc 18 whose rotation is controlled by a rotation drive system (not shown).

Meanwhile, the signal recorded on the floppy disc 18 is detected by the recording/reproduction head 17, and input through the recording/reproduction switch 16 to a pre-amplifier 19.

20 is a high-pass filter; 21 is an FM equalizer. The output of the pre-amplifier 19 is input through the high-pass filter 20 to the FM equalizer 21. The FM equalizer 21 is supplied with the L/H changeover signal 4.

The output signal of the FM equalizer 21 is input through the recording/reproduction changeover switch 7 to the multiplier 8, and the output signal of the multiplier 8 passes through the recording/reproduction changeover switch 10 to a band-pass filter 22 and is input to an FM demodulator 23.

24 is a low pass filter; 25 is a de-emphasis circuit. The output signal of the FM demodulator 23 is input through the low-pass filter 24 to the de-emphasis circuit 25. The de-emphasis circuit 25 is supplied with the L/H changeover signal 4 as the control signal. An output luminance signal 26 is produced from the de-emphasis circuit 25.

Next, the operation of the embodiment shown in FIG. 3 is described.

At first, the recording operation is described. The record luminance signal 1 of which the D.C. level of the sync. tip is fixed in the clamping circuit 2 is applied to the emphasis circuit 3. In the emphasis circuit 3, according to the L/H changeover signal 4 indicating the low-band FM recording mode (L) or the high-band FM recording mode (H) from the system controller (not shown), a constant of emphasis either for low-band FM recording or for high-band FM recording is set, and emphasis is laid on the output signal of the clamping circuit 2. It is then output as a signal level corresponding to the deviation of the low-band FM frequency allocation or high-band FM frequency allocation.

The output signal of the emphasis circuit 3 is FM-modulated in the FM modulator 5 so that when in either of the low-band FM recording mode and the high-band FM recording mode, the frequency of the sync. tip portion becomes 30 MHz. And, when in the low-band FM recording mode, an FM luminance signal that the frequency of the sync. tip portion is 30 MHz and the frequency of the white peak portion is 31.5 MHz is produced from the FM modulator 5. When in the high-band FM recording mode, another FM luminance signal that the frequency of the sync. tip portion is 30 MHz and the frequency of the white peak portion is 32 MHz is obtained.

The output signal of the FM modulator D is rid of the signal of less than 24 MHz in the high-pass filter 6, being input to the recording/reproduction changeover switch 7. The recording/reproduction changeover switch 7 is switched according to the recording/reproduction changeover signal 11, so that when recording, the output signal of the high-pass filter 6 is input to the multiplier 8.

In the multiplier 8, the output signal from the local oscillator 9 and the output signal from the high-pass filter 6 are multiplied and output. At this time, according to the L/H changeover signal 4 from the system controller (not shown), the local oscillator 9 produces a sine wave of 24 MHz when in the low-band FM recording mode, or a sine wave of 22 MHz when in the high-band FM recording mode. The output signal of the multiplier 8 is input through the recording/reproduction changeover switch 10 which is controlled by the recording/reproduction changeover signal 11, when recording, to the band-pass filter 12.

In the band-pass filter 12, the signals of not more than 2 MHz and not less than 16 MHz are removed. In such a manner, in the multiplier 8, the signal produced from the high-pass filter 6 is frequency-converted by using the signal output from the local oscillator 9, and supplied to the band-pass filter 12. Thereby as the output signal of the band-pass filter 12, an FM luminance signal that the frequency of the sync. tip portion is 6 MHz and the frequency of the white peak portion is 7.5 MHz is obtained when in the low-band FM recording mode. Also, when in the high-band FM recording mode, an FM luminance signal that the frequency of the sync. tip portion is 8 MHz and the frequency of the white peak portion is 10 MHz is obtained. And, the output signal of the band-pass filter 12 has the FM color-difference signal 14 added in the adder 13, and is input to the recording amplifier 15. And, through the recording/reproduction changeover switch 16 which is controlled by the recording/reproduction changeover signal 11, the output of the recording amplifier 15 is supplied to the recording/reproduction head 17. Thus, the FM image signal is recorded on the floppy disc 18.

Next, the reproducing operation is described.

In FIG. 3, the FM image signal recorded on the floppy disc 18 is detected by the recording/reproduction head 17 and input to the pre-amplifier 19 through the recording/reproduction changeover switch 16 which is controlled by the recording/reproduction changeover signal 11. After having been amplified, the output of the pre-amplifier 19 is rid of the signal of not more than 2 MHz by the high-pass filter 20, and input to the FM equalizer 21.

In the FM equalizer 21, according to the L/H changeover signal 4, compensation of the frequency characteristic is carried out with respect to the time of the low-band FM reproduction mode corresponding to the low-band FM recording mode, or the time of the high-band FM reproduction mode corresponding to the high-band FM recording mode. The output signal of the FM equalizer 21 is input to the multiplier 8 through the recording/reproduction changeover switch 7 which is controlled by the recording/reproduction changeover signal 11.

In the multiplier 8, the output signal from the local oscillator 9 and the output signal from the FM equalizer 21 are multiplied and output. At this time, the local oscillator 9, according to the L/H changeover signal 4 from the system controller (not shown), outputs the sine wave of 24 MHz when in the low-band FM reproduction mode, and the sine wave of 22 MHz when in the high-band FM reproduction mode. The output signal of the multiplier 8 is input to the band-pass filter 22 through the recording/reproduction changeover switch 10 which is controlled by the recording/reproduction changeover signal 11.

In the band-pass filter 22, the signals of not more than 24 MHz and not less than 38 MHz are removed. In such a manner, by frequency-converting the signal output from the FM equalizer 21 in the multiplier 8 by using the signal output from the local oscillator 9, and by supplying the converted signal to the band-pass filter 22, an FM luminance signal that the frequency of the sync. tip portion is 30 MHz and the frequency of the white peak portion is 31.5 MHz is output when in the low-band FM reproduction mode, and an FM luminance signal that the frequency of the sync. tip portion is 30 MHz and the frequency of the white peak portion is 32 MHz is output when in the high-band FM reproduction mode. The output signal of the band-pass filter 22 is FM-demodulated in the FM demodulator 23. Then in the low-pass filter 24, the baseband luminance signal is taken out. Further in the de-emphasis circuit 25, according to the L/H changeover signal 4, a constant of de-emphasis for low-band FM reproducing or for high-band FM reproducing is set to de-emphasize the output signal of the low-pass filter 24, and at the same time the amplification degree is caused to change depending on the deviation of the low-band FM frequency allocation or the high-band FM frequency allocation. Thus, an output luminance signal 26 of constant sync. level is produced.

Figure 1B:
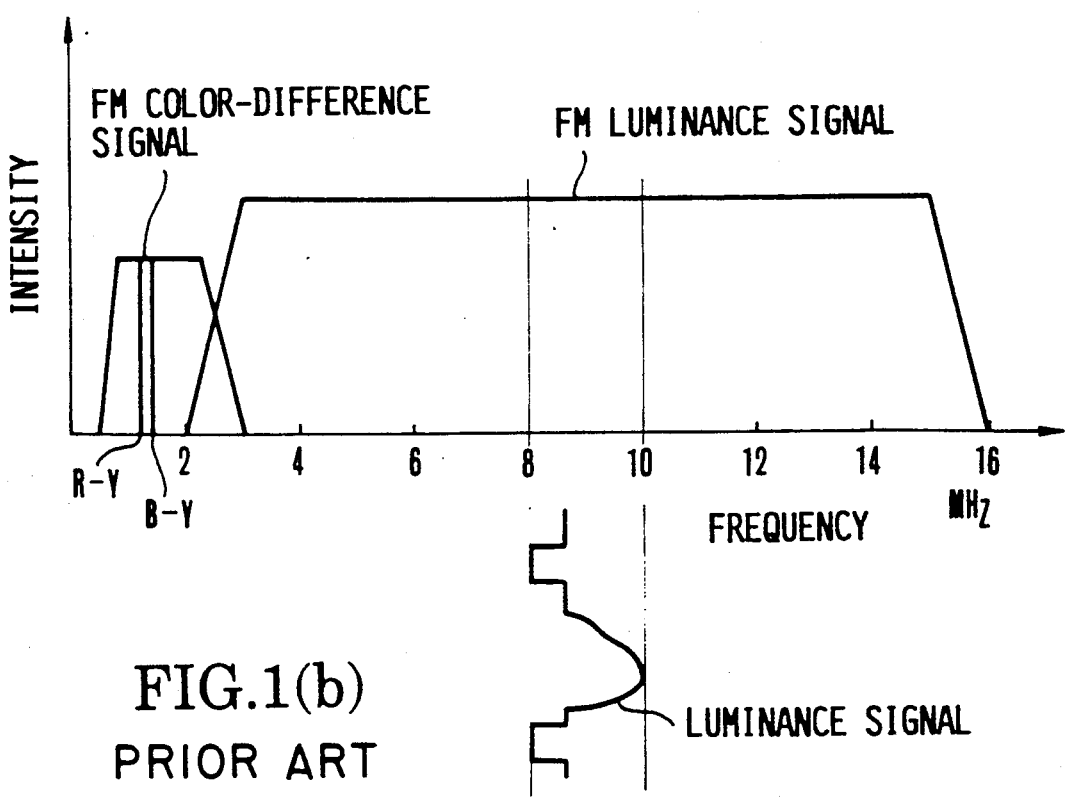
FIG. 1(b) is a graph to explain the high-band FM frequency allocation.
Figure 2A:
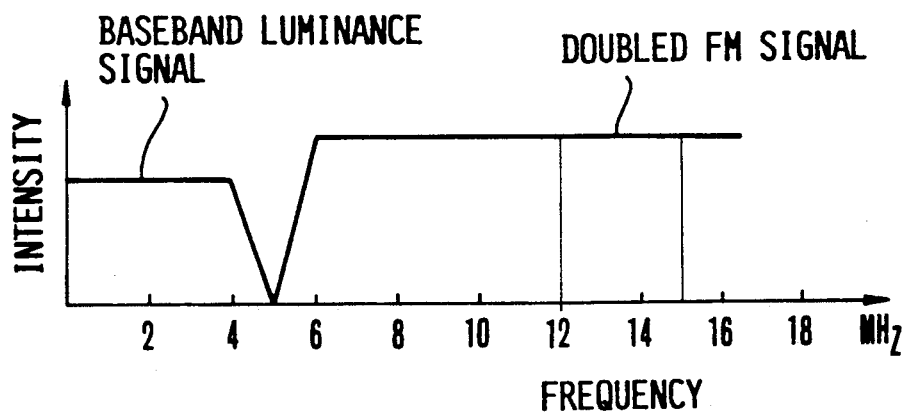
FIG. 2(a) and FIG. 2(b) are graphs to explain the disturbance of the doubled FM signal at the time of FM demodulation.
Figure 2B:
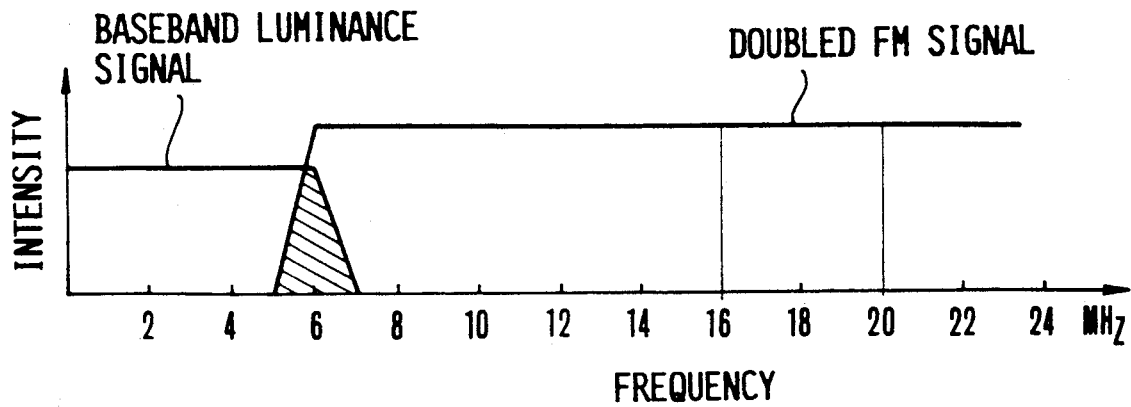

It should be noted that in the above-described embodiment, the arrangement to the two frequency allocations shown in FIG. 1(a) and FIG. 1(b) has been mentioned. But it is needless to say that it is likewise effective even to other frequency allocations. Further even to more than two frequency allocations, it is possible to cope with by altering the frequency of oscillation of the local oscillator 9.

Also, though in the above-described embodiment, the sync. tip frequency has been made to be the same frequency at the time of modulation, the pedestal frequency may be made to be the same frequency, or may not always be the same between the low-band FM image signal and the high-band FM image signal, yet has to be made almost the same to sufficiently obtain an equivalent effect.

Also, in this embodiment, the present invention has been described in the case of application to the still video system. Yet, the present invention can be applied to other recording and/or reproducing apparatus such as video tape recorder (VTR) or communication and-/or transmission apparatus to obtain equivalent advantages.

As has been described above, according to the invention, when recording, the angle-modulated luminance signal to be actually recorded is obtained by frequency conversion after the angle modulation to the first frequency band has been done. Therefore, it is possible to perform angle modulation where the frequency deviation to the frequency is apparently little. Hence the linearity is proper.

Also, by selecting one of the first reference signal and the second reference signal of different frequencies from each other when in frequency conversion, and by changing over the local oscillation frequency by using these reference signals, the sync. tip frequency or the pedestal frequency can be made to be almost the same between the second angle-modulated luminance signal and the third angle-modulated luminance signal, and the frequency deviation necessary to the angle modulation can be made little. Even to this there is an effect of improving the linearity.

Meanwhile, because, when reproducing, angle demodulation is performed after the frequency conversion of the reproduced second or third angle-modulated luminance signal once to the first angle-modulated luminance signal of the first frequency band, leak of an unnecessary signal to the baseband luminance signal band does not take place. Also because the frequency or the sync. tip portion or the frequency of the pedestal portion of the reproduced second or third angle-modulated luminance signal is converted to almost the same frequency by changing over the local oscillation frequency at the time of frequency conversion by using the first reference signal and the second reference signal, the linearity at the time of angle demodulation can be made proper.

What is claimed is:

1. An image signal recording apparatus for recording angle-modulated image signals on a recording medium, comprising:
   (A) angle-modulating means for inputting an image signal and angle-modulating the input image signal into a first frequency band located in a frequency band which is sufficiently higher than a second frequency band and a third frequency band which is wider than said second frequency band, thereby forming and outputting a first angle-modulated image signal;
   (B) recording operation mode indicating means for indicating either one of a first recording operation mode or a second recording operation mode, said first recording operation mode being a mode in which an image signal corresponding to an image having a first resolution is recorded on said recording medium and said second recording operation mode being a mode in which an image signal corresponding to an image having a second resolution higher than said first resolution is recorded on said recording medium;
   (C) reference signal generating means capable of selectively outputting a first reference signal and a second reference signal having a frequency higher than that of said first reference signal, said reference signal generating means being arranged to generate said first reference signals in the case where said first recording operation mode is indicated by said recording operation mode indicating means and to generate said second reference signal in the case where said second recording operation mode is indicated by said recording operation mode indicating means;

(D) frequency-converting means for frequency-converting said angle-modulated image signal into said second frequency band or said third frequency band on the basis of the first reference signal or the second reference signal which is selectively outputted from said reference signal generating means and outputting the frequency-converted signal; and (E) recording means for recording the angle-modulated image signal output from said frequency-converting means on the recording medium.

2. An apparatus according to claim 1, wherein a plurality of recording tracks are formed on said recording medium by recording the angle-modulated image signal output from said frequency-converting means by each one field on the recording medium.

3. An apparatus according to claim 1, wherein said recording medium includes a magnetic recording medium, and wherein said recording means includes magnetic head means for magnetically recording the angle-modulated image signal output from said frequency-converting means on said magnetic recording medium.

4. An image signal reproducing apparatus for reproducing an angle-modulated image signal from a recording medium, comprising:

(A) reproducing means for reproducing said angle-modulated image signal from the recording medium;

(B) reproducing operation mode indicating means for indicating either one of a first reproducing operation mode or second reproducing operation mode, said first reproducing operation mode being a mode in which an image signal corresponding to an image having a first resolution is reproduced from said recording medium and said second reproducing operation mode being a mode in which an image signal corresponding to an image having a second resolution higher than said first resolution is reproduced from said recording medium;

(C) reference signal generating means capable of selectively outputting a first reference signal and a second reference signal having a frequency higher than that of said first reference signal, said reference signal generating means being arranged to generate said first reference signals in the case where said first reproducing operation mode is indicated by said reproducing operation mode indicating means and to generate said second reference signal in the case where said second reproducing operation mode is indicated by said producing operation mode indicating means;

(D) frequency-converting means for frequency-converting said angle-modulated image signal reproduced from said reproducing means into a second frequency band which is located in a frequency band higher than said angle-modulated image signal reproduced from said recording medium, on the basis of said first reference signal or said second reference signal which is selectively outputted form said reference signal generating means, thereby forming and outputting a second angle-modulated image signal; and (E) angle-demodulating means for angle-demodulating said second angle-modulated image signal output from said frequency-converting means.

5. An apparatus according to claim 4, wherein said recording medium has a plurality of recording tracks formed thereon, and wherein one field of a first angle-modulated image signal or a second angle-modulated image signal is recorded in each of said plurality of recording tracks.

6. An apparatus according to claim 4, wherein said recording medium includes a magnetic recording medium, and wherein said reproducing means includes magnetic head means for reproducing a first angle-modulated image signal or a second angle-modulated image signal from said magnetic recording medium.

7. An image signal recording and reproducing apparatus for recording an image signal including at least a luminance signal on a recording medium and for reproducing the image signal from the recording medium having the image signal recorded thereon, comprising:

(A) modulating means for forming and outputting a first angle-modulated luminance signal by angle-modulating a luminance signal included in said image signal into a first frequency band which is located in a frequency band sufficiently higher than a second frequency band or a third frequency band which is wider than said second frequency band;

(B) recording and reproducing operation mode indicating means for indicating either one of a first recording and reproducing operation mode or a second recording and reproducing operation mode, said first recording and reproducing operation mode being a mode in which an image signal corresponding to an image having a first resolution is recorded on said recording medium and the image signal corresponding to the image having a first resolution is reproduced from said recording medium and said second recording and reproducing operation mode being a mode in which an image signal corresponding to an image having a second resolution higher than said first resolution is recorded on said recording medium and the image signal corresponding to the second resolution is reproduced from said recording medium;

(C) reference signal generating means capable of selectively outputting a first reference signal and a second reference signal having a frequency higher than that of said first reference signal, said reference signal generating means being arranged to generate said first reference signal in the case where said first recording and reproducing operation mode is indicated by said reproducing operation mode indicating means and to generate said second reference signal in the case where said second recording and reproducing operation mode is indicated by said reproducing operation mode indicating means;

(D) signal frequency-converting means commonly usable for recording and reproducing for frequency-converting said first modulated luminance signal on the basis of the first reference signal or said second reference signal selectively output from said reference signal generating means, thereby outputting a second modulated luminance signal having said second frequency band or a third modulated luminance signal having the third frequency band, at the time of recording, and for frequency-converting the signal reproduced from said recording medium into said first frequency band on the basis of the first reference signal or the second reference signal selectively outputted from said reference signal generating means, thereby outputting said first modulated luminance signal, at the time of reproduction;

(E) recording and reproducing means for recording said second modulated luminance signal or said third modulated luminance signal outputted from said signal frequency-converting means, at the time of recording, and for reproducing and outputting said second modulated luminance signal or said third modulated luminance signal, at the time of reproduction;

(F) demodulating means for demodulating the first modulated luminance signal outputted from said signal frequency-converting means and restoring the luminance signal, at the time of reproduction; and (G) signal supplying means for supplying the second modulated luminance signal or the third modulated luminance signal outputted from said modulating means to said frequency-converting means and supplying said second modulated luminance signal or said third modulated luminance signal outputted from said frequency-converting means to said recording and reproducing means, at the time of recording, and for supplying said second modulated luminance signal or said third modulated luminance signal reproduced from said recording medium by said recording and reproducing means to said frequency-converting means and supplying said first modulated luminance signal to said demodulating means, at the time of reproduction.

8. An apparatus according to claim 7, wherein a plurality of recording tracks are formed on said recording medium by recording the image signal by every one field on the recording medium, and wherein the image signal is sequentially reproduced by every one field from each of said plurality of recording tracks formed on said recording medium.

9. An apparatus according to claim 7, wherein said recording medium includes a magnetic recording medium, and said recording and reproducing means includes magnetic head means for magnetically recording said second modulated luminance signal or said third modulated luminance signal on said magnetic recording medium, at the time of recording, and for reproducing said second modulated luminance signal or said third modulated luminance signal from said recording medium, at the time of reproduction.

* * * * *

UNITED STATES PATENT AND TRADEMARK OFFICE
CERTIFICATE OF CORRECTION

PATENT NO. : 5,335,078

DATED : August 2, 1994

INVENTOR(S) : Saburou Nakazato

It is certified that error appears in the above-identified patent and that said Letters Patent is hereby corrected as shown below:

On the title page, item
    [30] Foreign Application Priority Data
        Sept. 22, 1987 [JP] Japan...Sho 62-238468

Col. 1, line 66, change "the" to --a-- and change "that" to --where--

Col. 2, line 3, change "for" to --in-- and change "that" to --where--

Col. 2, line 9, delete "to"

Col. 2, line 10, change "demodulate" to --demodulating--

Col. 2, line 57, change "signals" to --signal--

Col. 3, line 10, change "above" to --able--

Col. 3, line 15, change "on" to --an--

Col. 3, line 40, change "and" to --an--

Col. 3, line 46, change "which" to --while--

Col. 3, line 57, change "angle-demodulated" to --angle-modulated--

Col. 6, line 12, change "D" to --5--

Col. 8, line 17, change "engle modulation" to --angle-modulation--

Col. 9, line 46, change "signals" to --signal--

Col. 9, line 51, change "producing" to --reproducing--

Col. 9, line 61, change "form" to --from--

UNITED STATES PATENT AND TRADEMARK OFFICE
CERTIFICATE OF CORRECTION

PATENT NO. : 5,335,078

DATED : August 2, 1994

INVENTOR(S) : Saburou Nakazato

It is certified that error appears in the above-identified patent and that said Letters Patent is hereby corrected as shown below:

Col. 11, line 20, delete "supplying" and "said second"

Col. 11, line 21, after "signal" insert --supplying said second modulated luminance signal on said third modulated luminance signal--

Signed and Sealed this

Eighteenth Day of October, 1994

Attest:

BRUCE LEHMAN

*Attesting Officer*         *Commissioner of Patents and Trademarks*